Oct. 1, 1929.                C. SMITH                1,729,911
              MEANS FOR TRANSMITTING VARIABLE ROTATION
                    Filed July 25, 1927        3 Sheets-Sheet 1
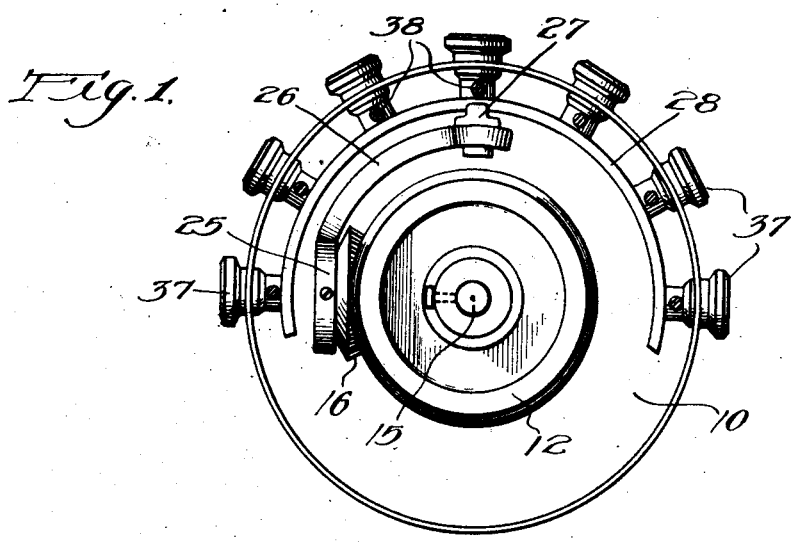
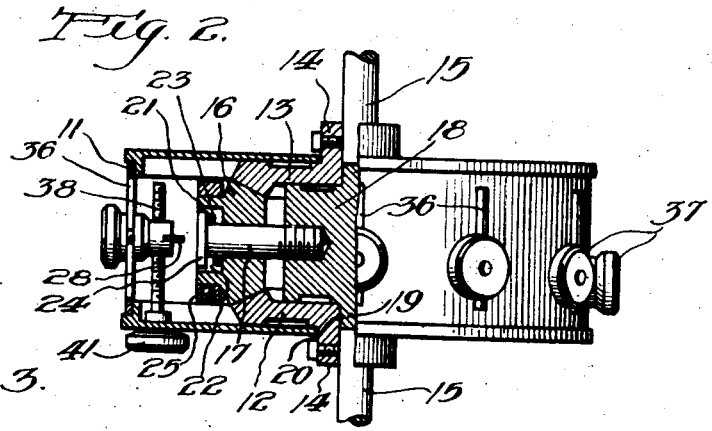
Inventor:
Charles Smith, Oct. 1, 1929.  C. SMITH  1,729,911
MEANS FOR TRANSMITTING VARIABLE ROTATION
Filed July 25, 1927  3 Sheets-Sheet 2

Inventor:
Charles Smith,

Oct. 1, 1929.  C. SMITH  1,729,911

MEANS FOR TRANSMITTING VARIABLE ROTATION

Filed July 25, 1927  3 Sheets-Sheet 3

Inventor
Charles Smith
By Banning & Banning
Attys

Patented Oct. 1, 1929

1,729,911

UNITED STATES PATENT OFFICE

CHARLES SMITH, OF CHICAGO, ILLINOIS, ASSIGNOR OF ONE-HALF TO WILLIAM CASEY, OF CHICAGO, ILLINOIS

MEANS FOR TRANSMITTING VARIABLE ROTATION

Application filed July 25, 1927. Serial No. 208,243.

The device of the present invention is intended primarily for use in connection with single dial control radio sets in which it is desirable to simultaneously impart rotation to a series of condensers, inductances, resistances or the like, and in which local conditions require that there should be slight individual variations from complete uniformity in individual rotation or adjustment, and the present invention is designed to provide the use of a variable transmission device adapted for adjustment to the degree required to impart such variations in rotation as may be required to harmonize the action of the individual constituents of a series of similar mechanisms.

Although the device is thus designed primarily to meet the requirements of radio control, it may have application to other conditions in which local variations from a uniform rotation are necessary in order to harmonize the action of the several rotating instrumentalities constituting a series. The invention is so designed that it may be easily introduced into the train of rotational transmission between the constituent elements of a series and may be adjusted and set to secure the needful variations, so that thereafter the turning of a suitable adjustable device, as, for instance, a dial, will impart to each of the constituents of the series the degree of rotation required to secure a harmonized action throughout the series. The device is capable of precise and accurate adjustment to meet local variations, so that harmonized turning or similar harmony of action will follow.

In the drawings:

Figure 1 is a side elevation of the device showing one side of the casing removed to exhibit the interior arrangement;

Fig. 2 is a half sectional view of the same;

Figure 3 is an enlarged sectional view through the periphery of the casing showing the means for locally adjusting the cam trackway which controls the variable transformation of the rotation imparted;

Fig. 4 is a detail of one of the tubular mountings for the cam trackway;

Fig. 5 is a similar detail in section taken on line 5—5 of Fig. 3;

Fig. 6 is a detail of the slotted adjustable plug which fits into the mounting of Fig. 3;

Fig. 11 is a view showing the case in section with the interior mechanism in edge elevation.

Figure 7:
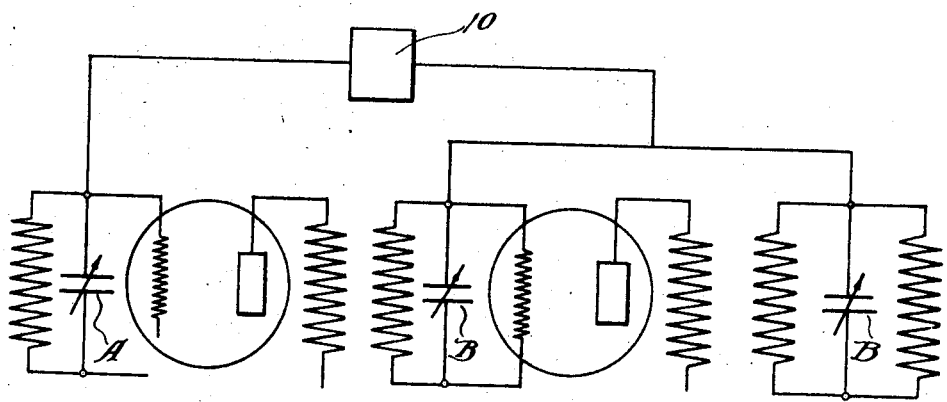
Fig. 7 is an electrical diagram showing the application of the present invention to the control of the condensers of a radio receiving set.

The transmitting mechanism of the invention (Figs. 1 to 8) is housed within a drum shaped shell comprising circular front and rear walls 10 and a peripheral side wall 11. Within the shell are located a pair of bevel faced gears 12 and 13, the former of which may, for convenience, be termed the driving element, and the latter the driven element in the train. Although these elements may be in the form of full gears, they will seldom be required to impart a full rotation, so that mutilated gears or segments having less than a complete circle of teeth may be employed. Each of the gears 12—or segments thereof, as the case may be—is provided with a hub 14 which extends outwardly through the proximate wall of the shell and is fixedly secured to a shaft 15. For convenience, we may regard the lower shaft 15 as the driving shaft.

The gears 12 and 13 are provided with oppositely disposed beveled teeth which mesh with the teeth of a medial beveled pinion 16 which may be a complete pinion or mutilated, where full rotation is not necessary, and the medial pinion is freely mounted upon a stud 17 which is threaded into a center mounting 18 provided with trunnions 19 which journal freely within bores 20 in the respective gears 12 and 13, which bores also fixedly receive the ends of the driving and driven shafts, so that the axes of the shafts and the pinion center mounting will be aligned.

The pinion is provided on its rear face with an outstanding neck 21 which is provided with a recess 22 to receive a spring 23 which bears against the head 24 of the screw stud 17, which spring serves to yieldingly hold the pinion in meshing relation with the teeth of the driving and driven gears. The neck 21 has rigidly mounted thereon a collar 25 which carries an arcuate arm 26, the curvature of which is concentric with the center of the shafts 15 and which, as shown, extends for about 90° around and outside of the peripheries of the driving and driven gear elements and the arm occupies a medial position between the planes of the two gears.

The end of the arm is provided with a slotted tongue 27 which embraces an arcuate cam trackway 28 preferably in the form of a thin strip of spring steel provided at recurrent intervals with outstanding tongues 29, each provided with a perforation 30. The arcuate cam trackway may be flexed laterally by means presently to be described, and this flexion of the trackway, in varying degrees at various points, will constitute the adjustment required to impart the variations from uniform rotation necessary in the harmonization of the series of units requiring variable adjustment.

Each of the tongues 29 is carried within a slot 31 formed in a plug 32 provided with a threaded stem 33, as best shown in Fig. 6. The plug has a sliding fit within a shell 34 which is also provided with a slot 35, which slot engages the sides of the thin flexible cam trackway 28. The stem 33 extends outwardly through a slot 36 in the periphery of the drum shaped housing to afford lateral adjustment of the shell 34 with the plug therein contained, the parts being locked in adjusted relation by means of a thumb nut 37 which is threaded onto the stem 33 exteriorly of the housing.

The required lateral adjustment is afforded by means of an adjusting screw 38 which is threaded through a pair of aligned openings 39 in the shell 34 and extends freely through a bore 40 in the plug 32 and through the bore 30 in the tongue 29. The adjusting screw is rotatably mounted within one of the side walls of the casing and is provided at its outer end with an adjusting head 41, so that by turning the head, the parts carried by the screw will be caused to travel laterally, thereby flexing the cam trackway to the necessary degree, and by providing a series of said adjusting devices located at close intervals along the trackway, the necessary configuration can be imparted to the trackway as a whole to secure the variable rotational adjustment desired at any particular instance in the range of turning imparted to the driving shaft section 15. By thus operating the adjustment mechanisms, and locking them in adjusted relation by the thumb nuts 37, the required configuration may be imparted to the trackway as a whole, which configuration will represent the variations required in the harmonization of the several units composing the series special to unified control.

As applied to radio requirements, the following special considerations are taken into account:

It is often desirable to adjust one or more elements of two or more circuits or net works simultaneously. It is often the case that two or more circuits do not have like frequency reactance characteristics. This is true when one circuit has distributed constants, such as an antenna or transmission line, and the other circuit consists of lumped inductance or capacity.

It is desirable that the variable elements of each circuit or net work be approximately alike in their electrical characteristics. The present invention is designed to compensate for the electrical difference between the two circuits or net works, and in Fig. 7, this condition is shown in a radio receiver, and is applied to a series of capacity elements or condensers which are usually made variable in order to change the wave length to which the receiver responds.

In the absence of variable mechanism for compensating the electrical differences, it has been necessary to employ two adjustments, one for the antenna circuit and the other for the succeeding circuits. This has been necessary partly because of the wide variation in antennæ and partly because of the fact that the circuit to which the antenna is coupled does not have the same reactance characteristics as the succeeding circuits.

Figure 8:
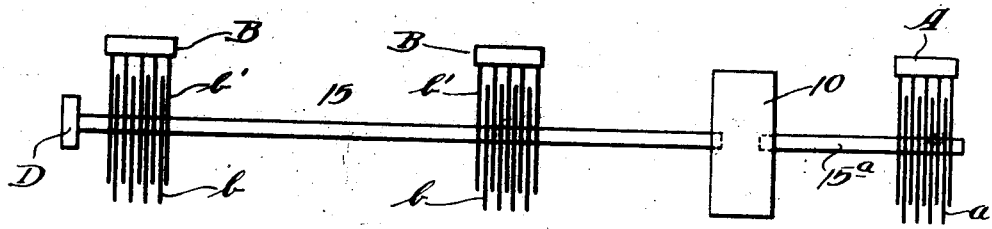
Fig. 8 is a mechanical diagram showing a series of condensers with the mechanism of the present invention interposed in the train of connections.
Figure 9:
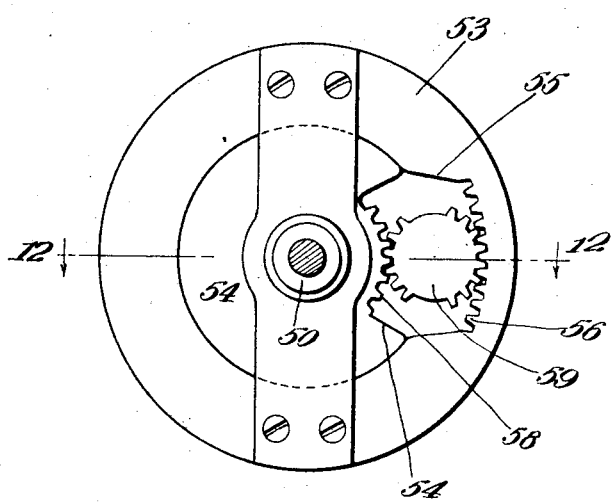
Fig. 9 is a side elevation with the case removed of a modified form of the device showing the use of somewhat differently arranged gear teeth.
Figure 10:
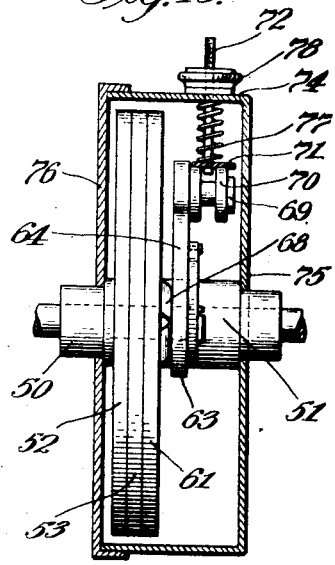
Fig. 10 is a similar view showing the opposite side of the device.
Figure 10:
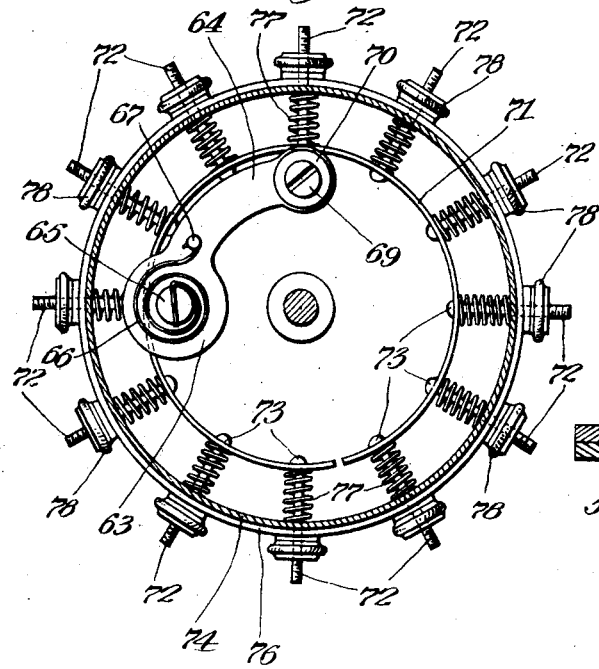

In applying the present invention under the conditions above set forth, reference is made to the diagram shown in Fig. 7 in which the present mechanism occupies a position intermediate the variable condenser A for the antenna circuit and the condenser B for the succeeding circuits. A mechanical diagram of the arrangement is shown in Fig. 8, in which the two condensers B and the condenser A are in coupled relation for unified adjustment by a single dial D.

The rotatable plates $b$ of the condensers B are indicated as mounted upon the shaft section 15 for coaction with the fixed condenser plates $b'$. In this arrangement, the shaft section 15 may be considered as the driving element, while the shaft section $15^a$ may be considered as a driven shaft element in conjunction with the variable mechanism 10 of the present invention. The rotating plates of the condenser A are designated by *a*, and it is evident from what has been heretofore set forth that it is desirable that the rotation imparted to the shaft section 15 be modified or corrected in the shaft section 15$^a$, or vice versa, in order to compensate for the electrical differences in the respective circuits.

The method in which the present mechanism operates to secure this result will now be described. Rotation imparted to the driving shaft section will be imparted uniformly to the driven shaft section so long as no independent rotation is imparted to the intermediate pinion which meshes respectively with the bevel gears 12 and 13. In the absence of such independent rotation, the parts will be in effect rigidly coupled together to rotate as a unit. If, however, the intermediate pinion be independently rotated, the rotation of the driven gear will be advanced or retracted by superposing the independent rotational effect upon the rotation imparted by the driving gear.

The amount of this independent rotation will be determined by the travel of the slotted tongue 27 along the adjusted cam trackway 28 which it embraces. By thus adjusting the trackway, so that it extends obliquely or curvedly from one side to the other of the medial line, a turning or rotational movement in the desired degree will be imparted to the medial pinion as it is revolved through the range of adjusting movement, and this turning movement will be reflected in the angle of rotation imparted to the driven shaft which may be more or less than the angle of rotation imparted to the driving shaft through the medium of the adjusting dial. It will be understood that in turning the driving shaft, the two gears and the intermediate pinion, together with the mounting 18, will rotate as a unit subject to the compensatory turning movements imparted to the driven elements by the means above described.

The invention is one which may be fitted into a very small compass, and, at the same time, may be very carefully and precisely adjusted to meet the individual requirements of any set with which the device is combined. After the electrical peculiarities of each set have been compensated by the desired adjustment of the trackway for each range of turning movement, the adjusted trackway can be locked, and will thereafter impose the necessary variation to compensate for the electrical difference peculiar to the set with which the mechanism is associated.

The modification shown in Figs. 9 to 12, inclusive, is similar in principle to that heretofore described, the chief difference being in the fact that the main gears are arranged in concentric relation with the interposed gear lying in intermediate relation within the plane of the main gears. In this instance, the shaft section, which may be conveniently referred to as the driving section, is numbered 50, which is aligned with the driven shaft section 51. The inner end of the driving shaft section is threaded onto a bridge plate 52, the ends of which are connected to an outer driving gear 53 which surrounds an inner driven ring 54, both rings lying in the same plane.

Figure 12:
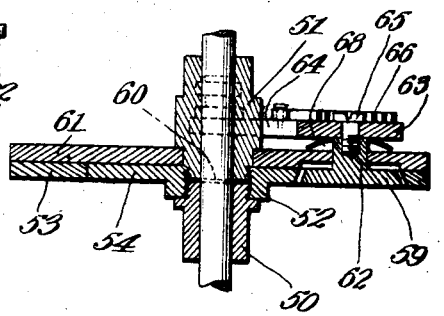
Fig. 12 is a cross sectional view of the interior mechanism taken on line 12—12 of Fig. 9.

The driving gear is provided with a recess 55 having inwardly facing gear teeth 56, and the inner driven gear is provided with a registering recess 57 having outwardly facing gear teeth 58. The inner and outer gear teeth mesh with the gear teeth of a medial gear element 59, which, as shown, is in the form of a mutilated pinion, and it is preferred to have the teeth in beveled relation, as indicated in Fig. 12, for reasons to be presently explained. The driven shaft 51 is reduced at its inner end 60 which is threaded onto the inner driven ring 54, so that motion imparted to the ring will be transferred to the shaft.

Behind the inner and outer rings and in facewise relation thereto is mounted a circular backing plate 61 which is journaled freely on the shaft and is adapted to rotate independently of the shaft. The intermediate gear element 59 is provided with a rearwardly extending stem 62 which is shouldered to receive the head 63 of an arm 64, the head being held in position by a headed screw 65, which is surrounded by a coil spring 66, the outer convolution of which is extended and makes connection with the arm 64 at the point 67, this arrangement serving to impart a thrust outwardly to the free end of the arm.

In order to hold the beveled intermediate gear element 59 into close meshing relation with the inner and outer teeth 56 and 58, a dish shaped spring washer 68 is interposed between the backing plate 61 and the head 63 of the arm. The outer end of the arm 64 is provided with a laterally extending pin 69 which journals a grooved roller 70, which bears against the inner face of a cam track 71 formed of thin steel and adapted to be adjusted by the provision of outwardly extending screw pins 72 having heads 73 on the inner side of the cam track.

The screw pins extend through the cylindrical wall 73 of a housing 75 which is closed on the opposite side by a cap 76, the screw pins 72 being surrounded by coil springs 77 and the pins are adjusted by thumb nuts 78, which permits the configuration of the cam track to be locally adjusted to any degree required to afford the necessary compensatory movement. The operation of this form of the device is in all respects similar to that heretofore described.

A driving rotation applied to the shaft 50 will be imparted through the bridge plate 52 to the outer gear toothed ring and through the intermediate gear element 59 to the inner ring, and so long as no independent rotation is imparted to the intermediate gear element, the driving and driven elements will turn in unison but by deforming the trackway to involve a departure from true circularity, the swinging of the arm 64 will result in a radial component of movement of the arm which will be reflected through the turning of the intermediate gear element in a compensatory rotary movement imparted to the driven element in all respects similar to that heretofore described. In fact, save for the form of the parts, the mode of operation of the device is in all essential respects similar to that first described.

Although, for convenience, the transmission train has been referred to as a gear train, it will be understood that in the use of the expression "gearing", it is intended to include the equivalent of gear elements, such as friction mechanism or the like, which are intended to co-operate in a manner equivalent to that of gearing, and it will also be understood that although gear elements are referred to, that expression is intended to include not only complete gears, but partial gears, or the like, for affording the extent of intermeshing commensurate with the adjusting requirements of the device.

I claim:

1. In mechanism of the class described, the combination of rotational driving and driven elements, gear elements in train between the driving and driven elements adapted to cause the two elements to rotate at substantially the same rate, a cam trackway, and a member riding on said cam trackway and connected with one of the elements of the gear train for imparting to said driven element a compensatory rotation to vary the rate of the driven element with respect to the driving element.

2. In mechanism of the class described, the combination of rotational driving and driven elements, gear elements in train between the driving and driven elements, a cam trackway, a member riding on said cam trackway and connected with one of the elements of the gear train for imparting to said element a compensatory rotation in degree commensurate with the configuration of the cam trackway, and means for adjusting such configuration at different points in the cam trackway.

3. In mechanism of the class described, the combination of rotational driving and driven elements, gear elements carried respectively by the driving and driven elements, an intermediate gear element in train with the two first-mentioned gear elements, means associated with said intermediate gear element for imparting independent compensatory rotation thereto when said gear is actuated by the turning of the driving element, and means for adjusting said means to impart the desired rotation at various stages in the rotation of the driving element.

4. In mechanism of the class described, the combination of a driving shaft and a driven shaft in aligned relation with one another, gear elements carried by the driving and driven shafts, an intermediate gear element in mesh with the driving and driven gear elements, a member connected with the intermediate gear element and extending at an angle to the axis thereof, and a cam trackway with which said member extends for imparting independent compensatory rotation to the intermediate gear element in degree commensurate with the configuration of the cam trackway.

5. In mechanism of the class described, the combination of a driving shaft and a driven shaft in aligned relation with one another, gear elements carried by the driving and driven shafts, an intermediate gear element in mesh with the driving and driven gear elements, a member connected with the intermediate gear element and extending at an angle to the axis thereof, a cam trackway with which said member extends for imparting independent compensatory rotation to the intermediate gear element in degree commensurate with the configuration of the cam trackway, and a series of adjusting devices at various points along the cam trackway for locally adjusting the configuration thereof.

6. In mechanism of the class described, the combination of a driving shaft and a driven shaft, a bevel faced pinion fixedly carried by each of the shafts, a medial bevel pinion in mesh with the driving and driven beveled pinions, an arm carried by the medial beveled pinion and extending at an angle to the axis thereof, and an arcuate cam trackway with which said arm engages for imparting compensatory turning movements to the intermediate gear element.

7. In mechanism of the class described, the combination of a driving shaft and a driven shaft, a bevel faced pinion fixedly carried by each of the shafts, a medial beveled pinion in mesh with the driving and driven beveled pinions, an arm carried by the medial beveled pinion and extending at an angle to the axis thereof, an arcuate cam trackway with which said arm engages for imparting compensatory turning movements to the intermediate gear element, and a plurality of adjusting screws located progressively along the cam trackway for adjusting the same locally to secure the desired configuration.

8. In mechanism of the class described, the combination of a driving shaft, a driven shaft, and an intermediate mounting in aligned axial relation to one another, bevel faced gears fixedly mounted respectively on the driving and driven shafts, an intermediate beveled pinion meshing with the driving and driven bevel faced gears, a stud projecting outwardly from the mounting and upon which the intermediate beveled pinion is journaled, an arcuately extending arm fixedly secured to the beveled pinion, an arcuate cam trackway extending in proximate relation to the arcuate arm with which trackway said arm engages, said cam trackway being configured at various points to extend laterally away from the plane of movement of the beveled pinion axis to impart lateral movements to the arm and compensatory movements to the beveled pinion.

9. In mechanism of the class described, the combination of a driving shaft, a driven shaft, and an intermediate mounting in aligned axial relation to one another, bevel faced gears fixedly mounted respectively on the driving and driven shafts, an intermediate beveled pinion meshing with the driving and driven bevel faced gears, a stud projecting outwardly from the mounting and upon which the intermediate beveled pinion is journaled, an arcuately extending arm fixedly secured to the beveled pinion, an arcuate cam trackway extending in proximate relation to the arcuate arm with which trackway said arm engages, said cam trackway being configured at various points to extend laterally away from the plane of movement of the beveled pinion axis to impart lateral movements to the arm and compensatory movements to the beveled pinion, and a series of adjusting screws connected with the cam trackway for adjusting the configuration thereof.

10. In combination with a pair of electrical elements requiring similar adjustment from a common source, a driving element carrying one of said electrical elements, and a driven element carrying the other electrical element, a gear train between the driving and driven elements, compensatory means for imparting independent compensatory rotation of one of the elements of said gear train during the rotation of the driving element, said compensatory means including a member rigidly secured to the said gear element, and a cam trackway associated therewith and adapted to impart compensating rotation to said gear element.

CHARLES SMITH.